United States Patent
Lemmers, Jr. et al.

(10) Patent No.: US 8,264,111 B2
(45) Date of Patent: Sep. 11, 2012

(54) GENERATOR ROTOR BEARING PRELOAD METHOD AND APPARATUS

(75) Inventors: Glenn C. Lemmers, Jr., Loves Park, IL (US); Andrew P. Grosskopf, Rockford, IL (US); Mark A. Osborn, Cherry Valley, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/348,144

(22) Filed: Jan. 11, 2012

(65) Prior Publication Data

US 2012/0104908 A1  May 3, 2012

Related U.S. Application Data

(62) Division of application No. 12/496,713, filed on Jul. 2, 2009, now Pat. No. 8,102,089.

(51) Int. Cl.
  *H02K 5/00* (2006.01)
(52) U.S. Cl. .......................................................... 310/91
(58) Field of Classification Search ............... 310/90–91
  See application file for complete search history.

(56) References Cited

U.S. PATENT DOCUMENTS

| | | | |
|---|---|---|---|
| 3,556,484 A | 1/1971 | Moller et al. | |
| 3,596,601 A * | 8/1971 | Kolf | 102/258 |
| 4,341,968 A | 7/1982 | Borden et al. | |
| 4,361,060 A | 11/1982 | Smyth | |
| 4,384,230 A | 5/1983 | Wisner | |
| 4,411,596 A | 10/1983 | Chilman | |
| 4,743,163 A | 5/1988 | Markunas et al. | |
| 4,796,871 A * | 1/1989 | Bauer et al. | 267/64.11 |
| 5,211,171 A | 5/1993 | Choromokos | |
| 5,433,514 A | 7/1995 | Tsukamoto et al. | |
| 5,943,918 A | 8/1999 | Reed, Jr. et al. | |
| 5,995,312 A | 11/1999 | Macleod | |
| 6,196,801 B1 | 3/2001 | Muhlbauer | |
| 6,446,339 B2 | 9/2002 | Takamizawa et al. | |
| 6,455,975 B1 | 9/2002 | Raad et al. | |
| 6,672,260 B1 | 1/2004 | Sun | |
| 6,712,518 B2 | 3/2004 | Takamizawa et al. | |
| 6,995,529 B2 | 2/2006 | Sibley | |
| 7,074,010 B2 | 7/2006 | DeGroff et al. | |
| 7,296,360 B2 | 11/2007 | El-Katcha et al. | |
| 7,371,011 B2 | 5/2008 | McKeirnan, Jr. | |
| 7,498,682 B2 | 3/2009 | Lemieux | |
| 7,744,473 B2 * | 6/2010 | Zimmermann et al. | 464/73 |
| 8,084,902 B2 * | 12/2011 | Lemmers et al. | 310/52 |
| 8,102,089 B2 * | 1/2012 | Lemmers et al. | 310/91 |
| 2004/0049904 A1 * | 3/2004 | Reale | 29/426.5 |
| 2010/0156113 A1 * | 6/2010 | Lemmers, Jr. | 290/1 |

* cited by examiner

*Primary Examiner* — Tran Nguyen
(74) *Attorney, Agent, or Firm* — Carlson, Gaskey & Olds P.C.

(57) ABSTRACT

A generator has its length shortened by placing springs in a space in a casing that includes an output shaft, which is driven by an input shaft, and a yoke for separating the two shafts. The generator is assembled by placing a spring in a space in a casing having a first part. The space also has a yoke in it. A rotor bearing is placed in the space adjacent to and impinging upon the spring. A second part of the casing is attached to the first part of the casing so that the spring is pre-loaded therein. The generator also utilizes a guide for holding a spring. The generator also has a thrust plate for applying a force of the springs upon the rotor bearing.

15 Claims, 4 Drawing Sheets

GENERATOR ROTOR BEARING PRELOAD METHOD AND APPARATUS

RELATED APPLICATION

This application is a divisional application of U.S. Ser. No. 12/496,713, which was filed on Jul. 2, 2009 now U.S. Pat. No. 8,102,089.

BACKGROUND OF THE INVENTION

Some generators, including those used with commercial aircraft, are required by design to disconnect from power transferred from a gearbox or other power transfer mechanism in the event of generator failure. Disconnecting the generator is a safety precaution to reduce the likelihood that a broken generator would damage the gearbox or engine and to reduce further damage to the generator. Some generators effectively use a yoke having a ramp to disconnect the generator from the gearbox. A yoke requires axial space to disconnect a gear shaft from a generator axle.

Modern variable frequency aircraft generators typically utilize axially preloaded angular contact bearings in order to increase the generator critical speed. This preload spring has traditionally been a crest-to-crest wave spring that is placed within a generator casing.

Reduction of the weight of aircraft parts to increase the efficiency of aircraft is a normal goal of aircraft part designers.

SUMMARY OF THE INVENTION

According to the invention, a generator has its length shortened by placing springs in a space in a casing in which a yoke operates to separate an output shaft from an input shaft thereby reducing the length and weight of the generator.

According to the invention, a method of assembling a generator involves placing a spring in a space in a casing having a first part. The space also has a yoke in it. A rotor bearing is placed adjacent to and impinges upon the spring. Then a second part of the casing is attached to the first part of the casing so that the spring is pre-loaded in the space.

According to an embodiment of the invention, an aircraft generator utilizes a spring guide for holding a spring. The spring guide has a cylindrical body having an outside diameter such that a ratio of the outside diameter of the cylindrical body to an outside diameter of the spring is approximately 0.56.

According to a further embodiment of the invention, a thrust plate for use in an aircraft generator has a flat ring-shaped body having an interior diameter and an exterior diameter defining a width such that a ratio of the width of said body to the outer diameter is approximately 0.16

According to a further embodiment of the invention, a liner for an aircraft generator having a plurality of springs therein has a ring-shaped body having an inner diameter of 3.973 inches or 100.9 mm and an outer diameter of 4.337 inches or 110.16 mm, and a plurality of cut-outs disposed in the inner diameter.

According to a still further embodiment of the invention, an assembly for an aircraft generator having a bearing therein has a spring guide, a spring disposed around said spring guide a liner aligning the spring guide, and a thrust plate contiguous to the spring and the bearing.

BRIEF DESCRIPTION OF THE DRAWINGS

The present invention will be more fully understood by reference to the following detailed description of a preferred embodiment when read in conjunction with the accompanying drawing, in which like reference characters refer to like parts throughout the views and in which.

DETAILED DESCRIPTION OF THE PREFERRED EMBODIMENT OF THE PRESENT INVENTION

Figure 1:
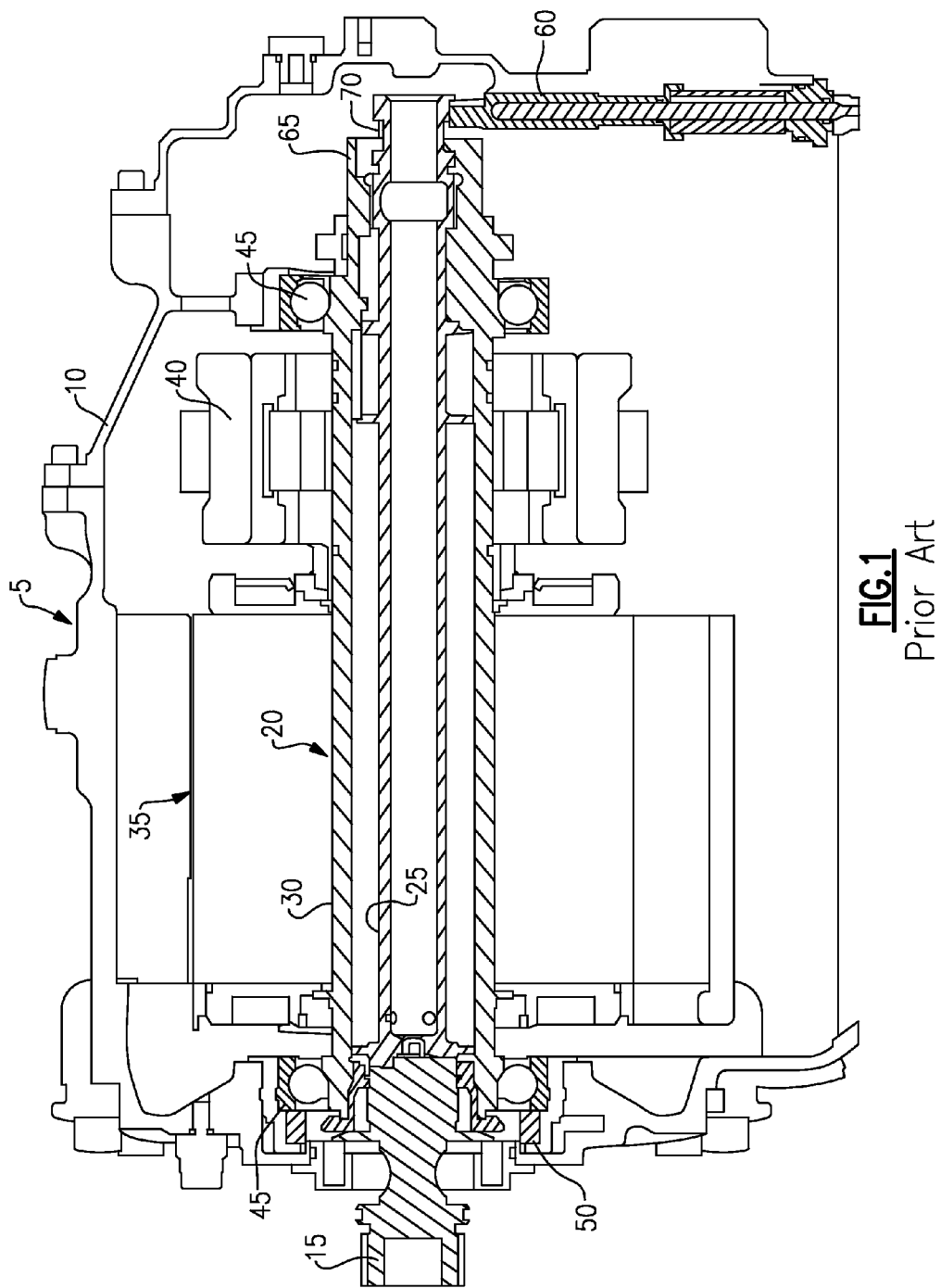
FIG. 1 is a schematic cross-sectional view of a prior art generator using a crest-to-crest wave spring.

Referring now to FIG. 1, a prior art embodiment of a commercial aircraft generator 5 having a casing 10 is shown. The generator has an input shaft 15 that receives rotating power from a gear box (not shown) or a power source (not shown). The input shaft is selectively coupled to an output shaft assembly 20 that comprises an inner shaft 25 that rotates with an outer shaft 30. The inner shaft 25 may move selectively and axially within the outer shaft to separate the inner shaft 25 from the input shaft 15. The outer shaft 30 supports a rotor balance assembly 35.

The rotor balance assembly 35 and the output shaft 30 are supported by a pair of bearing assemblies 45. A wave spring (see also FIG. 2) 50 is preloaded against the bearing assemblies in order to increase the generator critical speed as is known in the art. The wave spring is disposed about the input shaft 15 within the casing 10.

A yoke 60 is disposed within the casing 10 at a distal end 65 of the output shaft assembly 20. The yoke moves towards the inner shaft 25 and engages a ramped surface 70 thereon to move the inner shaft axially away from the input shaft thereby disengaging the inner shaft 25 from the input shaft 15. In certain situations, like damage to the generator, the generator must be disabled to avoid damage to the gear box or other power source (not shown) or further damage to the generator.

Figure 2:
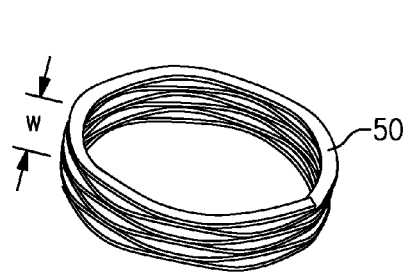
FIG. 2 is a perspective view of a prior art crest-to-crest wave spring.

The axial length of the generator 5 includes the width of the wave spring 50 (see FIG. 2). The wave spring is disposed at an end of the casing that is distal from the yoke 60. According to the invention, however, the wave spring 50 is eliminated and axial springs 150 (as will be described hereinbelow) are placed proximal to the yoke to eliminate the wave spring and to thereby minimize the width of the generator 5.

Figure 4:
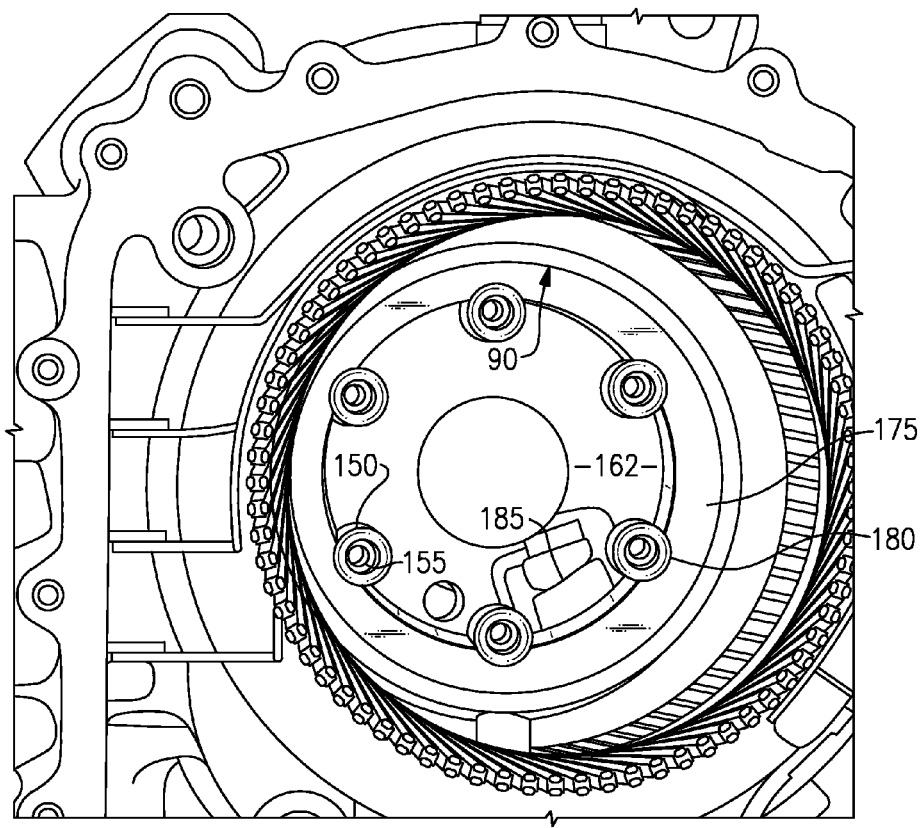
FIG. 4 is a schematic, perspective, top view of the generator incorporating the present invention.
Figure 3:
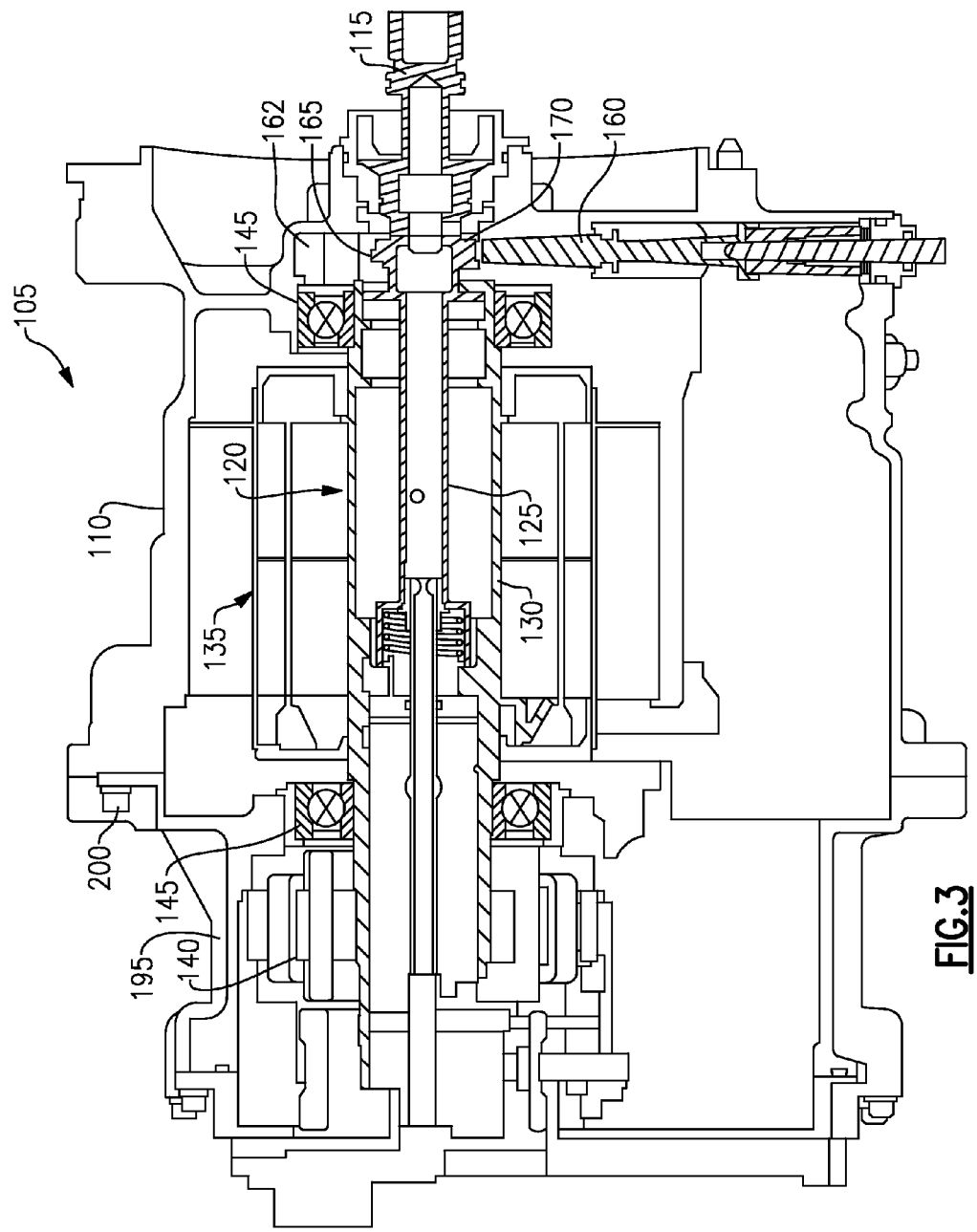
FIG. 3 is a is a schematic cross-sectional view of a generator incorporating the present invention.
Figure 5:
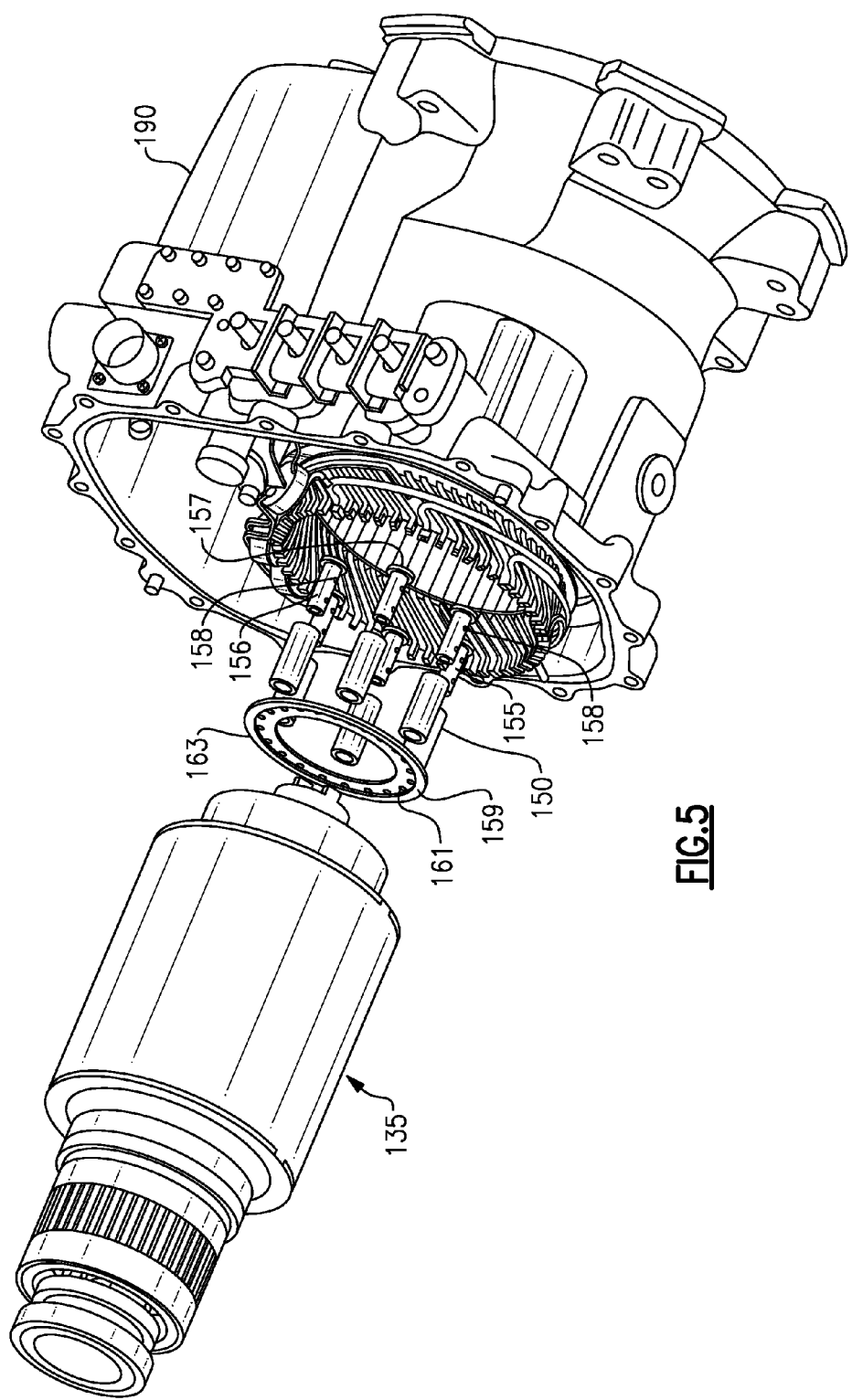
FIG. 5 is a perspective side view of a portion of the generator incorporating the present invention

Referring now to FIGS. 3-5, an embodiment of the invention is disclosed. As with the prior art, a generator 105 having a casing 110 is shown. The generator has an input shaft 115 that receives rotating power from a gear box (not shown) or a power source (not shown). The input shaft is selectively coupled to an output shaft assembly 120 that comprises an inner shaft 125 that rotates with an outer shaft 130. The inner shaft 125 may move selectively and axially within the outer shaft to separate the inner shaft 125 from the input shaft 115. The outer shaft 130 supports a rotor balance assembly 135.

The rotor balance assembly 135 and the output shaft 130 are supported by a pair of bearing assemblies 145. A plurality of helical springs (see also FIGS. 4 and 5) 150 are preloaded against the bearing assemblies. Each helical spring has free length of 1.645 inches or 41.783 mm and an installed, preloaded length of 1.305 inches or 33.147 mm. Each helical spring is disposed upon a top-hat shaped spring guide 155 having a cylinder 156 having diameter that is less than a diameter of each helical spring and a round base 157. Each spring guide has a length of 1.060 inches or 26.924 mm such that the ratio between the length of the helical spring and the spring guide is 1.231. Each spring has an outside diameter of 0.575 inches or 14.605 mm and each spring guide has an outside diameter of 0.317 inches or 8.051 mm such that the ratio of said helical spring diameter to the spring support diameter is 1.814. Further the base 157 of the spring guide has a diameter of 0.595 inches or 15.113 mm such that the ratio of the diameter of the base and the outside diameter of the cylinder is 1.877. The spring guides minimize a probability that the springs will buckle under load. Each cylinder 156 has a pair of holes 158 to lighten the weight of the spring guides.

A flat ring-shaped thrust plate 159 engages each of the springs and a bearing assembly 145. The thrust plate has an inner diameter of 2.660 inches or 67.564 mm and an outer diameter of 3.925 inches or 99.695 mm defining a width of 0.6325 inches or 16.066 mm such that a ratio between the width and the outer diameter of such thrust plate is 0.161. The thrust plate also has an outer rim 163 disposed thereon facing the bearing assembly 145.

As is known in the art, the bearing assemblies 145 need lubrication. Given the position of the thrust plate described herein, the communication between lubricating oil (not shown) and the bearing assemblies may be impeded. Therefore to avoid any impedance in communication of the oil and the bearing assemblies, the thrust plate 159 has a plurality of holes 161 disposed therein to allow oil to flow therethrough.

A yoke 160 is disposed within the casing 110 in a space 162 at a proximal end 165 of the output shaft assembly 120. The yoke moves towards the inner shaft 125 and engages a ramped surface 170 thereon to move the inner shaft axially away from the input shaft thereby disengaging the inner shaft 125 from the input shaft. In certain situations, like damage to the generator, the generator must be disabled to avoid damage to the gear box or other power source (not shown).

Figure 6:
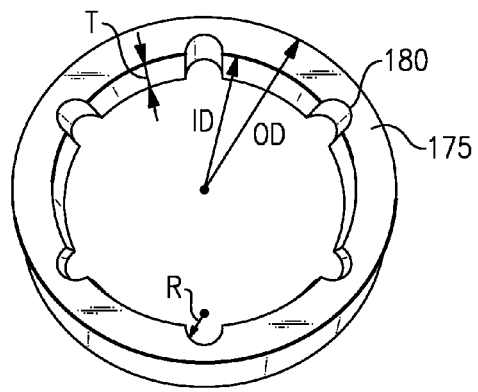
FIG. 6 is a perspective view of a bearing liner used in the generator of FIG. 4.

Referring to FIGS. 4 and 6, the space 162 has a bearing liner 175 disposed therein. The bearing liner has a ring-shaped body having an inner diameter of 3.735 inches or 94.869 mm, an outer diameter of 4.3372 inches or 110.165 mm, and plurality of scalloped cutouts 180 in the inner diameter for seating the base 157 of each spring guide 155. The space also houses an end 185 of the yoke 160 that engages the ramped surface 170 of the inner shaft 125. Because the end 185 is in the space 162, a continuous spring could not be disposed therein. Each scalloped cutout has a radius of 0.3175 inches or 8.064 mm and encompasses an arc of 84.5 degrees. Thickness T of the liner 175 and the length of each spring guide 156 serves to limit the compression of the helical springs 150.

Referring now to FIG. 5, the assembly of the invention is shown. A first half 190 of the casing 110 is disposed vertically. Each helical spring 150 is disposed upon a spring guide 155. Each spring guide is placed in the cutout 180 in the bearing liner 175 in the space 162. The thrust plate 159 is placed against each spring and the rotor balance assembly 135 including the output shaft assembly 120 (See FIG. 3) is lowered onto the thrust plate and springs in the space 162. The second half 195 (see FIG. 3) of the casing is then attached to the first half 190 of the casing by bolts 200. As the bolts are tightened, the helical springs 150 are preloaded against a bearing assembly 145 as desired.

By switching from a wave spring 50 that is at an end of the generator that is distal from the yoke 60, to a plurality of helical springs 150 in the essentially unused space 162 at an end of the generator that is proximal to the yoke 160, the length of the generator is reduced by the width of the wave spring 50. Because the yoke 160 protrudes into space 162, a wave spring could not be used therein and other types of springs, like helical springs, are used.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

The invention claimed is:

1. An assembly for an aircraft generator having a bearing therein comprising:
   a spring guide;
   a spring disposed around said spring guide;
   a liner aligning said spring guide; and
   a thrust plate contiguous to said spring and the bearing.

2. The assembly of claim 1 wherein a ratio of an installed length of said spring and a length of said spring guide is approximately 1.231 to one.

3. The assembly of claim 1 wherein said thrust plate has a flat ring-shaped body having an interior diameter and an exterior diameter defining a width such that a ratio of the width of said body to said outer diameter is approximately 0.161.

4. The assembly of claim 1 wherein said liner comprises a ring-shaped body having a plurality of cut-outs disposed in said inner diameter therein.

5. The assembly of claim 4 wherein each cut-out defines an arc of approximately 84.5 degrees.

6. The assembly of claim 2 wherein said spring guide comprises:
   a cylindrical body said cylindrical body having an outside diameter such that a ratio of the outside diameter of said spring to an outside diameter of said body is approximately 0.56.

7. The assembly of claim 2 wherein said guide further comprises a round base attached to an end of said cylindrical body wherein a ratio of the diameter of the base to said outside diameter of the cylindrical body is approximately 1.877.

8. A liner for a generator having a plurality of springs therein comprising:
   a ring-shaped body having an inner diameter of 94.869 mm and an outer diameter of approximately 4.334 inches; and
   a cut-out disposed in said inner diameter therein, said cut-out supporting a spring.

9. The liner of claim 8 wherein each cut-out defines an arc of approximately 84.5 degrees.

10. The liner of claim 9 wherein each cut-out defines a radius of approximately 8.064 mm.

11. A thrust plate for communicating a load on a bearing in an aircraft generator, said thrust plate comprising:
    a flat ring-shaped body having an interior diameter and an exterior diameter defining a width such that a ratio of the width of said body to said outer diameter is approximately 0.161.

12. The thrust plate of claim 11 wherein said thrust plate has a plurality of holes passing therethrough for allowing a lubricating fluid to communicate through said thrust plate with said bearing.

13. The thrust plate of claim 11 in which said ring-shaped body has a rim disposed along its outer diameter.

14. A guide for a helical spring for use in an aircraft generator, said guide comprising:
a cylindrical body said cylindrical body having an outside diameter such that a ratio of the outside diameter of said body to an outside diameter of said spring is approximately 0.56.

15. The guide of claim 14 wherein said guide further comprises a round base attached to an end of said cylindrical body wherein a ratio of the diameter of the base to said outside diameter of the cylindrical body is approximately 1.814.

* * * * *